S. G. STARLING AND A. J. HUGHES.
ANEROID BAROMETER.
APPLICATION FILED DEC. 23, 1918.
1,377,032.
Patented May 3, 1921.
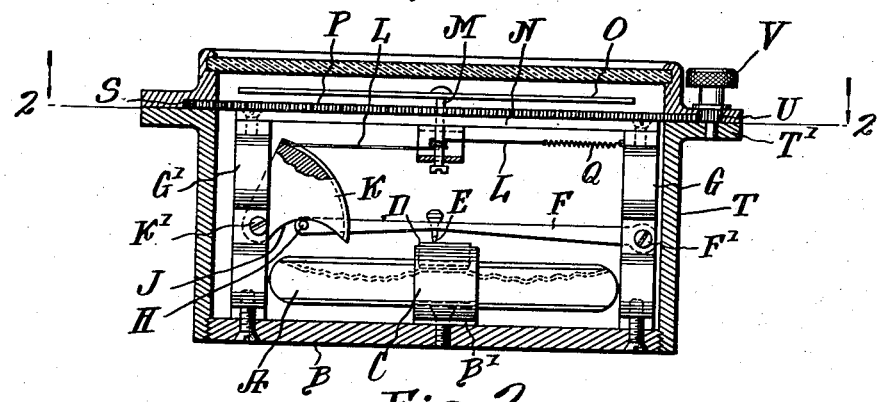
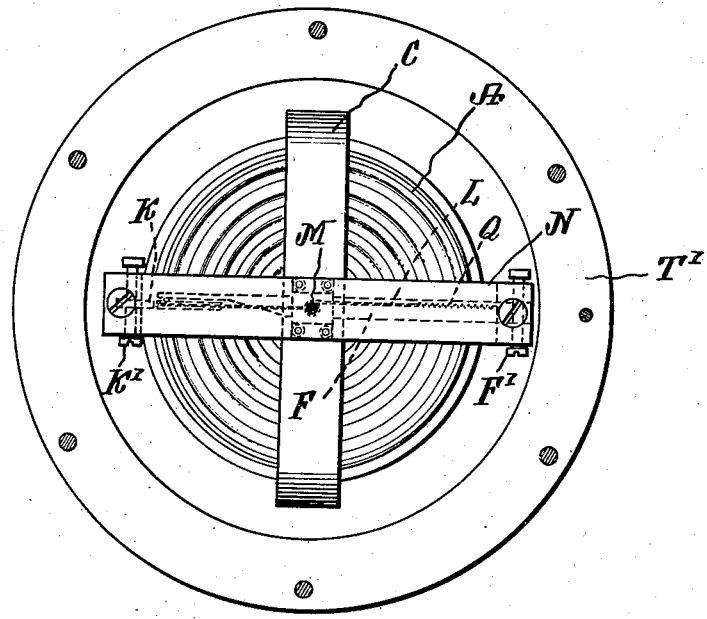
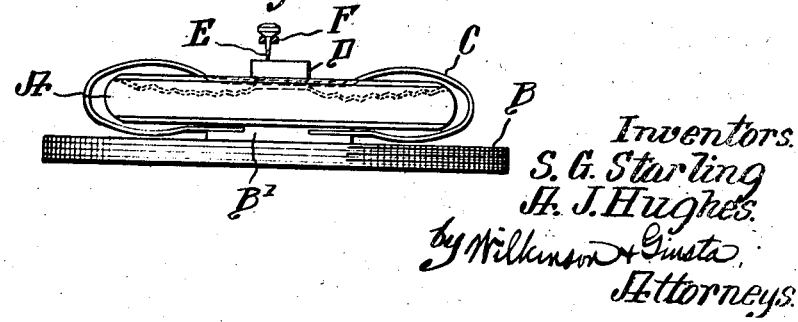
Inventors.
S. G. Starling
A. J. Hughes.
by Wilkinson & Fisher
Attorneys.

UNITED STATES PATENT OFFICE.

SYDNEY GEORGE STARLING, OF FOREST GATE, AND ARTHUR JOSEPH HUGHES, OF LONDON, ENGLAND, ASSIGNORS TO HENRY HUGHES AND SON LIMITED, OF LONDON, ENGLAND, A CORPORATION OF ENGLAND.

ANEROID BAROMETER.

1,377,032.     Specification of Letters Patent.     Patented May 3, 1921.

Application filed December 23, 1918. Serial No. 268,062.

*To all whom it may concern:*

Be it known that we, SYDNEY GEORGE STARLING, of 61 Windsor road, Forest Gate, in the county of Essex, England, and ARTHUR JOSEPH HUGHES, of 59 Fenchurch street, in the city and county of London, England, both subjects of the King of Great Britain, have invented a new and useful Improvement in and Relating to Aneroid Barometers, of which the following is a specification.

This invention relates to aneroid barometers or altimeters for measuring the barometric pressure, or height above earth by means of barometric pressure, and it has for its object an improved construction of the vacuum box and of the mechanism and calibrating or adjusting system of the aneroid.

According to our invention the free or movable face of the vacuum box is provided with a plane surface on which rests a point on a pivoted lever that is in sliding contact with the surface of a pivotally mounted cam preferably connected to the pointer of the instrument through a wheel or quadrant having fixed to it one end of a cord that rests on the periphery of the wheel or quadrant and is wound around a drum fixed on the pointer-spindle, the other end of the cord being secured to a tensioning spring.

By suitably shaping the cam, any desired relation can be obtained between the angle moved through by the pointer and the variation in the pressure of the atmosphere on the walls of the vacuum box, *e. g.*, equal angles moved through by the pointer may correspond to equal increments or decrements of pressure, or to equal increments or decrements of altitude.

In order to reinforce the movable walls of the vacuum box, a light piece of steel spring is fitted across the same, preferably so as to extend around both sides of the box. By varying the strength of this spring and the degree of vacuum in the box, the instrument can be adapted to measure any desired range of pressures or altitudes.

In the accompanying drawing we have shown how our said invention may be conveniently and advantageously carried into practice.

In this drawing:—

Figure 1 is a side elevation partly in vertical central section, and

Fig. 2 a plan with parts removed showing an instrument constructed according to our invention.

Fig. 3 is a partial side elevation looking at right angles to the view in Fig. 1.

The vacuum box A is constructed in the usual way and mounted on the base plate B of the instrument, a light piece C of steel spring being fitted to extend around the vacuum box A, across a diameter thereof. The ends of the spring are secured to a block B' on the base plate B, and the upper middle part is secured to the center of the upper movable wall of the vacuum box. This spring may be varied in strength according to the scale of pressure to be measured and the extent of vacuum created in the box.

In the center of the vacuum box, on the upper face, and on the top of the middle of the spring C, there is fitted a disk D of steel, glass, sapphire, or the like having a polished flat upper surface, and on the plane thus formed there rests a small agate point E attached to the center of a steel arm or lever F which is pivoted at F' in a brass standard G. The other end of the arm is provided with a lateral pin H bearing against a cam surface J formed on a quadrant K pivoted at K' to the standard G' and on the periphery of which a groove is cut to receive a fine thread or cord L of metal, fiber, silk, or other suitable material. This cord is stretched from the quadrant K to the pointer-spindle M which is centrally mounted in suitable bearings in a frame member N, and carries an indicating pointer O movable around the scale of a dial P indicating barometric pressure or height according to the particular type of instrument. One end of the cord L being attached to the groove in the quadrant K, the said cord is threaded through the spindle M, and the two ends are wound several times around the latter, and the free end of said cord is carried across and above the vacuum box and is attached to a tension spring Q connected to the standard G, whereby the cord is kept taut and the return of the indicating pointer to the initial position is insured.

The cam J is formed to a curve suitably calculated to produce a scale of pressure or height according to requirement, *e. g.*, a scale in which equal angles indicate equal increments or decrements of pressure or height.

In operation, when the instrument is subjected to change in pressure, the vacuum box A will contract or expand and by the interaction of the polished center plate D and the agate point E, a corresponding movement of the lever F is produced so that the pin H at the other extremity of the lever F actuates the quadrant, the cord in the groove of the latter being carried backward or forward and the central spindle M with its pointer O being accordingly moved to a like extent.

The dial P is shown rotatably mounted in an annular channel S in the casing T and is provided with peripheral teeth to enable it to be rotated by means of a pinion U. This pinion is mounted to turn in bearings in the flange T' of the casing T and is provided with a milled head V.

What we claim as our invention and desire to secure by Letters Patent, is:—

1. An aneroid barometer comprising a vacuum box, a lever in operative relation with said vacuum box and adapted to be moved in response to variations in the barometric pressure as the same affects said box, a pivoted segment having an under cam face freely resting upon the free end of said lever and movable about its pivot with the latter, indicating means, and a connection between said indicating means and said segment, substantially as described.

2. An aneroid barometer comprising a vacuum box, a lever in operative relation to said vacuum box movable in response to variations in the barometric pressure as the latter affects said box, a segment pivoted near the free end of said lever and having a single cam surface extending along one edge thereof and adapted to rest upon the free end of said lever whereby the segment will be moved by the lever, pivoted indicating means, and a flexible connection between said indicating means and the segment, substantially as described.

3. An aneroid barometer comprising a casing, a vacuum box supported within the casing, a block beneath the vacuum box, a flat spring having its free ends fitted in said block, said spring extending diametrically about said vacuum box and being in engagement with the central part of the diaphragm thereof, a block supported upon the spring at the portion at which it makes contact with the diaphragm, a needle engaging said last mentioned block, a lever carrying said needle, supporting posts within said casing, one of said posts having a fulcrum for said lever, a segment pivoted in the other post and adapted to swing vertically, said segment having a cam face along one radial edge, means on the free end of the lever coöperating with the cam face of the segment, a scale in the upper part of the casing, an indicator moving over said scale, a shaft for the indicator, a flexible connection wound intermediately about said shaft and having one end connected to said segment, and spring means connecting the other end of said connection with one of said posts, substantially as described.

SYDNEY GEORGE STARLING.
ARTHUR JOSEPH HUGHES.